United States Patent
Hashimoto

[11] Patent Number: 6,009,052
[45] Date of Patent: Dec. 28, 1999

[54] METHOD AND CIRCUIT FOR CONTROLLING HEAD POSITION

[75] Inventor: Shuichi Hashimoto, Kawasaki, Japan

[73] Assignee: Fujitsu Limited, Kawasaki, Japan

[21] Appl. No.: 08/164,783

[22] Filed: Dec. 10, 1993

Related U.S. Application Data

[63] Continuation of application No. 07/766,384, Sep. 27, 1991, abandoned.

[30] Foreign Application Priority Data

Dec. 25, 1990 [JP] Japan .................................. 2-406139

[51] Int. Cl.$^6$ ................................. G11B 7/00; G11B 3/90
[52] U.S. Cl. ............................................ 369/44.28; 369/58
[58] Field of Search ........................... 369/43, 48, 44.27, 369/44.28, 47, 54, 58, 53; 360/78.06, 78.08, 78.11

[56] References Cited

U.S. PATENT DOCUMENTS 5,016,126  5/1991  Horie et al. ...................... 360/78.11 X

FOREIGN PATENT DOCUMENTS

53-72606   6/1978   Japan .
58-177573  10/1983  Japan .
1-150284   6/1989   Japan .

*Primary Examiner*—Paul W. Huber
*Attorney, Agent, or Firm*—Staas & Halsey, LLP

[57] ABSTRACT

A head positioning method controls a position of a servo head from a first arbitrary track position on a disk to a second arbitrary track position on the disk during a seek operation, where the servo head reads a servo signal from tracks formed on the disk. The head positioning method comprises the steps of setting an moving quantity of the servo head, controlling velocity and position of the servo head depending on the initial moving quantity and a difference between a present track position of the servo head and the second arbitrary track position, and ending the seek operation after a predetermined access time elapses from a start of the seek operation when an actual access time is shorter than the predetermined access time. The predetermined access time is preset depending on the initial moving quantity, and the actual access time is a time it actually takes for the servo head to move from the first arbitrary track position to the second arbitrary track position.

19 Claims, 8 Drawing Sheets

METHOD AND CIRCUIT FOR CONTROLLING HEAD POSITION

This application is a continuation of application Ser. No. 07/766,384, filed Sep. 27, 1991, now abandoned.

BACKGROUND OF THE INVENTION

The present invention generally relates to methods and circuits for controlling head position, and more particularly to a method of controlling head position in a magnetic disk unit in which a voice coil motor is used to drive a head during a seek operation, and a circuit for controlling the head position in the magnetic disk unit.

When controlling the head position during a seek operation in which a voice coil motor is used to drive the head, it is desirable to move head at a high velocity and to minimize the seek error rate.

Figure 1:
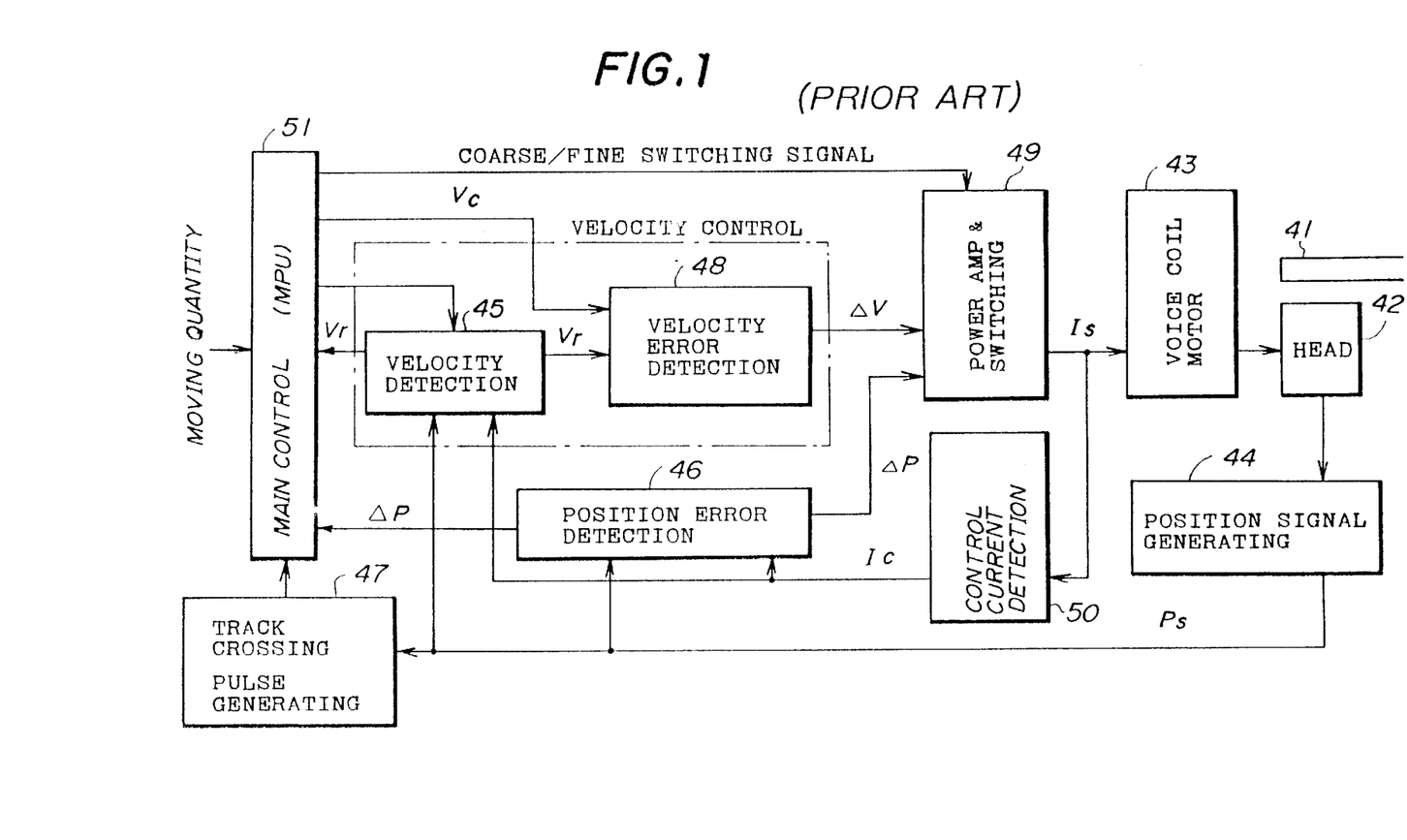
FIG. 1 is a system block diagram showing an example of a head positioning circuit of a conventional magnetic disk unit.

FIG. 1 shows an example of a head positioning circuit of a conventional magnetic disk unit. In FIG. 1, a voice coil motor 43 drives a servo head (magnetic head) 42 which reads servo information from a magnetic disk 41, and the head position is determined by the voice coil motor 43. A position signal generating circuit 44 generates a position signal Ps from a signal which is read by the servo head 42, and supplies the position signal Ps to a velocity detection circuit 45, a position error detection circuit 46 and a track crossing pulse generating circuit 47. The magnetic disk 41 is one of a plurality of magnetic disks which are arranged coaxially.

The velocity detection circuit 45 detects an actual velocity Vr from the position signal Ps and a detection circuit Ic which will be described later, and supplies the actual velocity Vr to a velocity error detection circuit 48. The velocity error detection circuit 48 detects a velocity error signal $\Delta V$ from the actual velocity Vr and a target velocity Vc, and supplies the velocity error signal $\Delta V$ to a power amplifier and switching part 49. A control current Is which is output from the power amplifier and switching part 49 drives the voice coil motor 43 and is detected by a control current detection circuit 50 which generates the detection current Ic described above. This detection current Ic is supplied to the velocity detection circuit 45 as described above and is also supplied to the position error detection circuit 46. The position error detection circuit 46 detects a position error signal $\Delta P$ from the position signal Ps and the detection current Ic, and supplies the position error signal $\Delta P$ to the power amplifier and switching part 49.

The track crossing pulse generating circuit 47 generates a track crossing pulse from the position signal Ps, and supplies the track crossing pulse to a main control part 51 which is formed from a micro processor unit (MPU). The main control part 51 generates the target velocity Vc depending on a moving quantity of the servo head 42, monitors the position of the servo head 42 from the track crossing pulse, and supplies to the power amplifier and switching part 49 a coarse/fine switching signal which switches the control from a coarse velocity control to a fine position control in a vicinity of the target position. The switching part of the power amplifier and switching part 46 switches the velocity error signal $\Delta V$ from the velocity error detection circuit 48 or the position error signal $\Delta P$ from the position error detection circuit 46 in response to the coarse/fine switching signal, and outputs the control current Is.

The velocity detection circuit 45 and the velocity error detection circuit 48 form a velocity control part. On the other hand, the position error detection circuit 46, the track crossing pulse generating circuit 47, the power amplifier and switching part 49, the control current detection circuit 50 and the main control part 51 form a position control circuit.

When the main control part 51 receives the moving quantity (number of tracks) of the servo head 42, the main control part 51 generates the target velocity Vc which is dependent on the moving quantity and supplies the target velocity Vc to the velocity error detection circuit 48. As a result, the control current Is is supplied to the voice coil motor 43 via the velocity error detection circuit 48 and the power amplifier and switching part 49, so as to drive the servo head 42. When it is detected via the position signal generating circuit 44 and the track crossing pulse generating circuit 47 that the servo head 42 has reached a position in the vicinity of the target position, the power amplifier and switching part 49 is switched to the position control side. As a result, the position control of the servo head 42 is carried out depending on the position error signal $\Delta P$ which is output from the position error detection circuit 46, and the servo head 42 is positioned to the target track.

Figure 2:
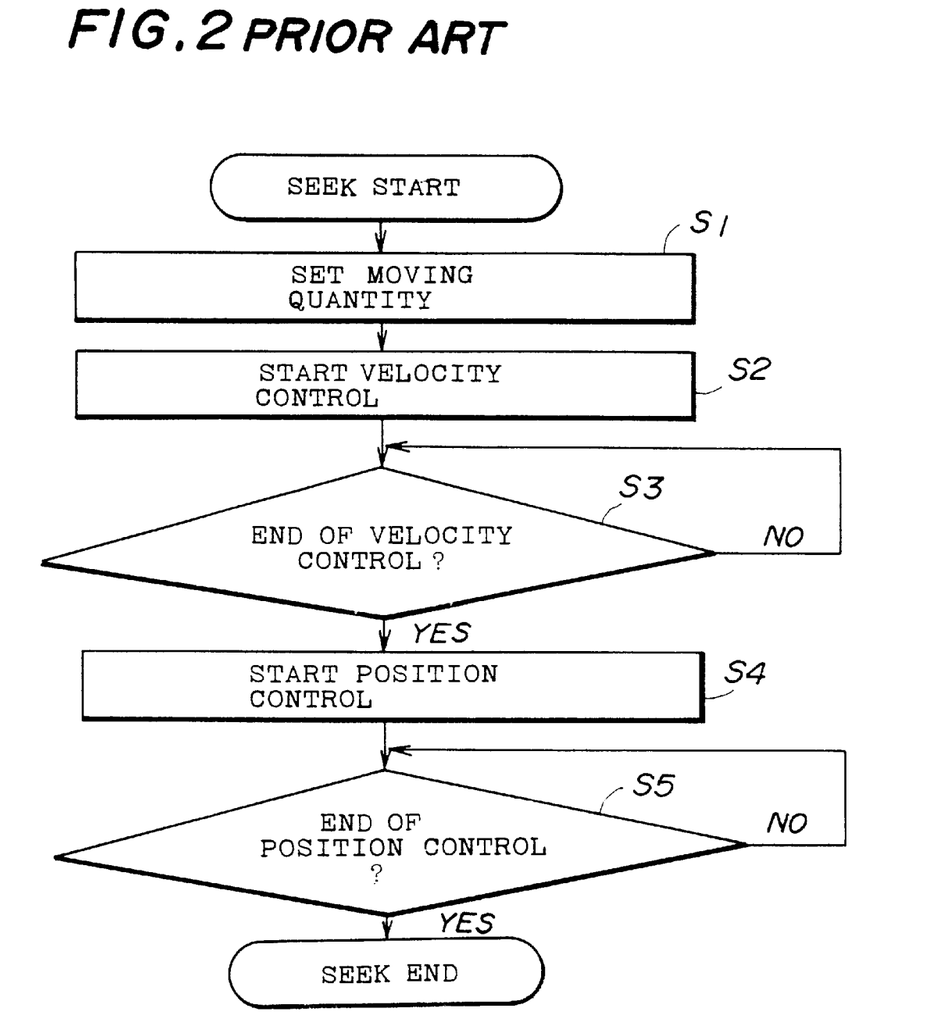
FIG. 2 is a flow chart for explaining the conventional head positioning control.

The above described head positioning control is carried out by the procedure shown in FIG. 2. When the seek operation is started in FIG. 2, a step S1 sets the moving quantity of the servo head 42. A step S2 starts the velocity control of the servo head 42, and a step S3 decides whether or not the velocity control is ended. When the decision result in the step S3 becomes YES, a step S4 starts the position control of the servo head 42. A step S5 decides whether or not the position control is ended, and the process ends when the decision result in the step S5 becomes YES.

However, when the position control of the servo head 42 is carried out in the magnetic disk unit, the resonance of the servo head 42 may occur. The conventional positioning control circuit delays the access time with respect to a seek instruction which is received within a predetermined time after the resonance of the servo head 42 is detected, and suppresses the resonance by providing a constant resonance attenuation time. For this reason, there is a problem in that the access time is inevitably delayed every time the seek instruction is received within the predetermined time after the resonance of the servo head 42 is detected.

Figure 3:
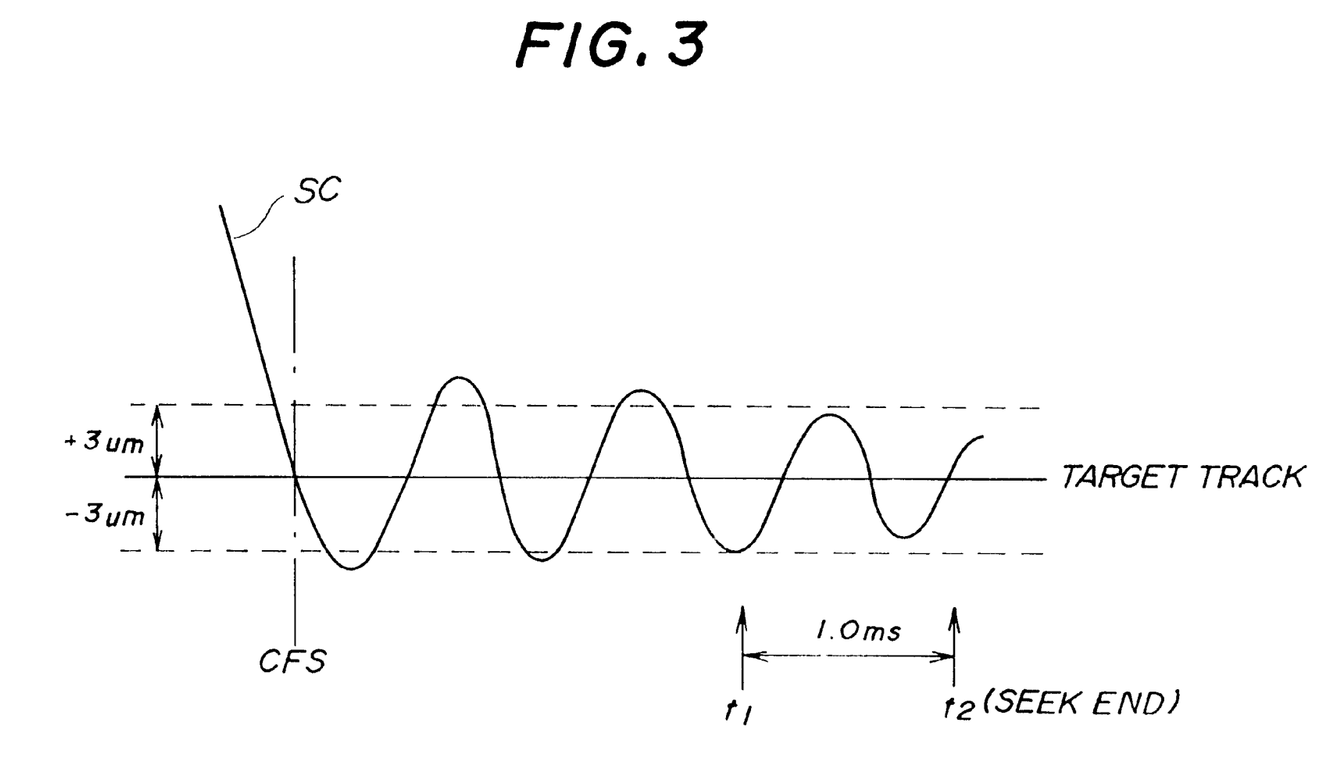
FIG. 3 is a diagram for explaining the resonance of a servo head for explaining the problems of the conventional head positioning control.

FIG. 3 shows an example of the scanning locus SC of the servo head 42 when the seek operation is carried out. In FIG. 3, CFS denotes a switching time when the coarse/fine switching signal from the main control part 51 undergoes a transition, t1 denotes a time when the positional error of the servo head 42 falls within a certain range (for example, ±3 μm), and t2 denotes a time when the seek operation is ended. For example, the time t2 occurs 1.0 ms after the time t1. As may be seen from FIG. 3, even if a seek instruction is received between the times t1 and t2, the access time is delayed to a time after the time t2 so that the resonance of the servo head 42 is suppressed.

However, although the resonance is suppressed to a certain degree by the provision of the settling time of 1.0 ms, the access time becomes long. Particularly when two seek operations are made immediately after one another, the resonance of the servo head 42 is accumulated, and it takes considerable time for the positional error of the servo head 42 to fall within the certain range.

SUMMARY OF THE INVENTION

Accordingly, it is a general object of the present invention to provide a novel and useful method and circuit for controlling head position, in which the problems described above are eliminated.

It is an object of the present invention to minimize the access time of a magnetic disk unit.

Another and more specific object of the present invention is to provide a head positioning method for controlling a position of a servo head from a first arbitrary track position on a disk to a second arbitrary track position on the disk during a seek operation, where the servo head reads a servo signal from tracks formed on the disk and the head positioning method comprises the steps of setting an initial moving quantity of the servo head, controlling velocity and position of the servo head depending on the initial moving quantity and a difference between a present track position of the servo head and the second arbitrary track position, and ending the seek operation after a predetermined access time elapses from a start of the seek operation when an actual access time is shorter than the predetermined access time, where the predetermined access time is preset depending on the initial moving quantity and the actual access time is a time it actually takes for the servo head to move from the first arbitrary track position to the second arbitrary track position. According to the head positioning method of the present invention, it is possible to effectively minimize the access time while suppressing the unstable state of the servo head which may lead to resonance of the servo head.

Still another object of the present invention is to provide a head positioning circuit for controlling a position of a servo head from a first arbitrary track position on a disk to a second arbitrary track position on the disk during a seek operation, where the servo head reads a servo signal from tracks formed on the disk and the head positioning circuit comprises position control means, supplied with an initial moving quantity of the servo head, for controlling position of the servo head based on the initial moving quantity and a difference between a present track position of the servo head and the second arbitrary track position, and velocity control means, coupled to the position control means, for controlling velocity of the servo head based on the initial moving quantity and the difference. The position control means includes a control part for ending the seek operation after a predetermined access time elapses from a start of the seek operation when an actual access time is shorter than the predetermined access time, the predetermined access time is preset depending on the initial moving quantity, and the actual access time is a time it actually takes for the servo head to move from the first arbitrary track position to the second arbitrary track position. According to the head positioning circuit of the present invention, it is possible to effectively minimize the access time while suppressing the unstable state of the servo head which may lead to resonance of the servo head.

Other objects and further features of the present invention will be apparent from the following detailed description when read in conjunction with the accompanying drawings.

DESCRIPTION OF THE PREFERRED EMBODIMENTS

Figure 4:
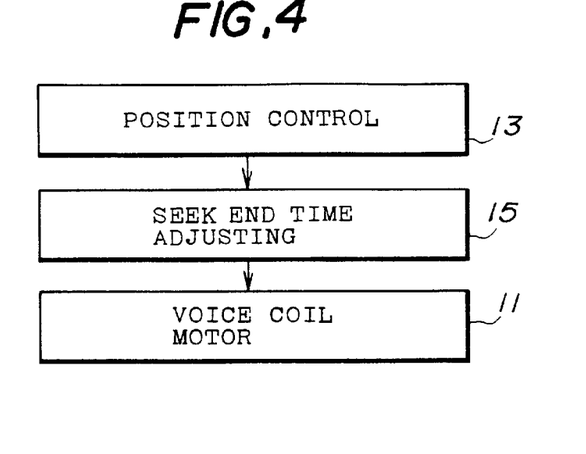
FIG. 4 is a system block diagram for explaining an operating principle of the present invention.

First, a description will be given of an operating principle of the present invention, by referring to FIG. 4. FIG. 4 shows a position control circuit 13, a seek end time adjusting part 15 and a voice coil motor 11 which drives a head (not shown).

The position control circuit 13 controls the voice coil motor 11 via the seek end time adjusting part 15. When carrying out a seek operation in which the head is driven by the voice coil motor 11 and moved to a target position, a predetermined access time which is dependent on the moving quantity of the head is preset in the seek end time adjusting part 15. The seek end time adjusting part 15 carries out a control such that the seek operation is continued to a predetermined access time Ta if the actual access time falls short of the predetermined access time Ta. The seek operation may be ended if the actual access time exceeds the predetermined access time Ta.

The actual access time in a stage prior to the resonance state may appear to be shorter than the predetermined access time Ta which is normally required. In such a case, the resonance component included in the access time becomes accumulated and generate the resonance state. Accordingly, the present invention continues the seek operation to the predetermined access time Ta even if the actual access time falls short of the predetermined access time Ta, so as to prevent the generation of the resonance state in advance.

The predetermined access time Ta may be set less than or equal to an predetermined value which is dependent on the moving quantity of the head. In this case, the end of the seek operation is extended only when the actual access time falls short of the predetermined access time Ta, so as to suppress the unstable state prior to the resonance state each time.

On the other hand, the predetermined access time Ta may be set greater than the predetermined value which is dependent on the moving quantity of the head. In this case, the end of the seek operation is constantly set after the predetermined access time Ta, so as to prevent the generation of the unstable state prior to the resonance state from the beginning.

Next, a description will be given of an embodiment of a head positioning circuit according to the present invention, by referring to FIG. 1. This embodiment is applicable to the magnetic disk unit shown in FIG. 1.

In FIG. 1, a voice coil motor 43 drives a servo head (magnetic head) 42 which reads servo information from a magnetic disk 41, and the head position is determined by the voice coil motor 43. A position signal generating circuit 44 generates a position signal Ps from a signal which is read by the servo head 42, and supplies the position signal Ps to a velocity detection circuit 45, a position error detection circuit 46 and a track crossing pulse generating circuit 47. The magnetic disk 41 is one of a plurality of magnetic disks which are arranged coaxially, and the magnetic disks other than the magnetic disk 41 are used for storing data.

Figure 5:
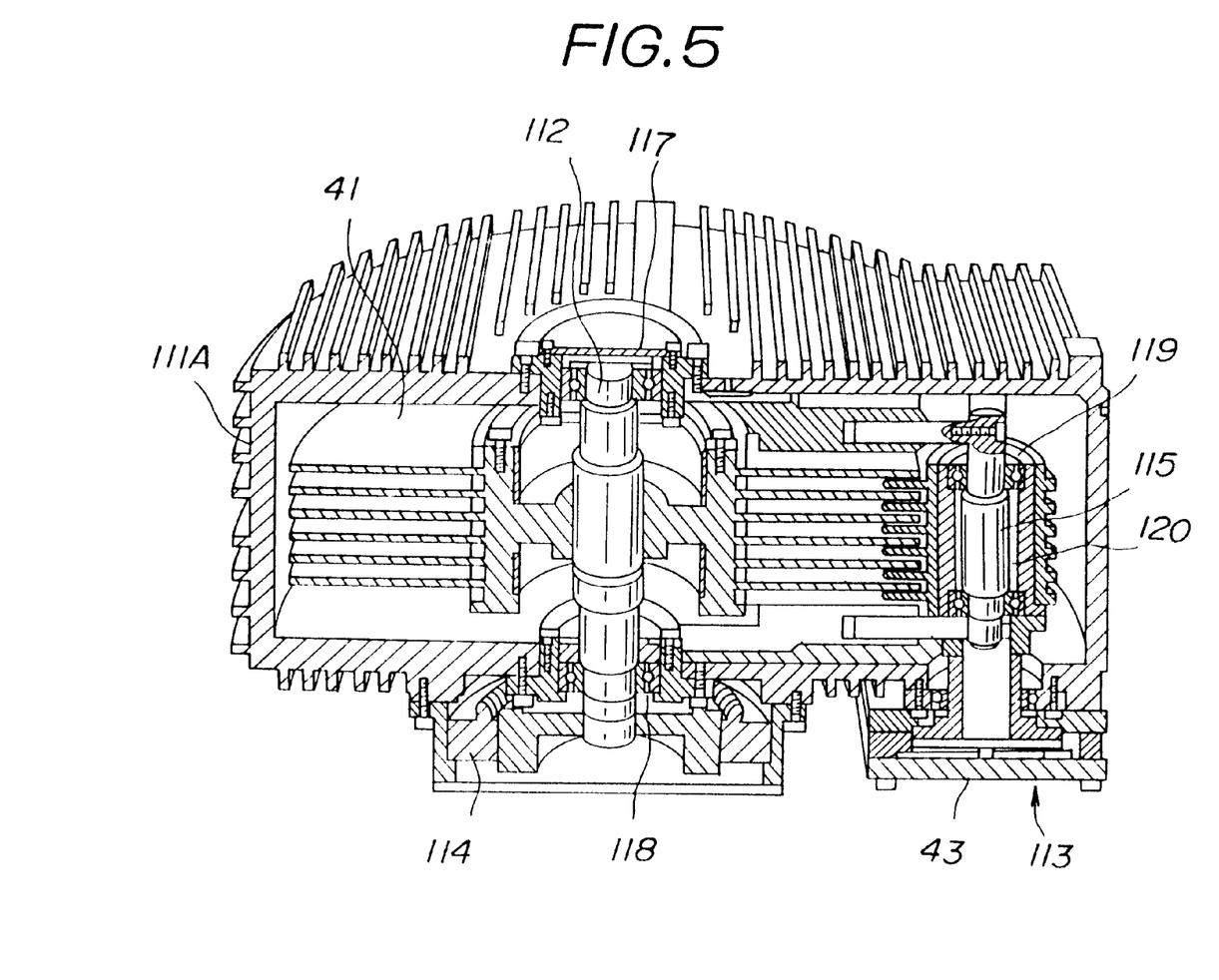
FIG. 5 is a cross sectional view showing a servo head and a magnetic disk shown in FIG. 1.

FIG. 5 shows the servo head 42 and the magnetic disk 41 shown in FIG. 1. In FIG. 5, the servo head 42 writes data to and reads data from the magnetic disk 41. The magnetic disk 41 is one of a plurality of magnetic disks 41 accommodated within a shell part 111A of a housing as shown in FIG. 5. The housing supports a spindle 112 of a magnetic disk pack and a magnetic head positioner 113. In FIG. 5, six magnetic disks 41 are assembled in a stack around the spindle 112, but the number of magnetic disks may be varied depending on the memory capacity of the magnetic disk unit. The spindle 112 is supported at both ends by ball bearings 117 and 118. These bearings 117 and 118 contain a ferrofluidic seal which keeps airtight the space between the inside and outside separated by the bearing while assuring free rotation of the spindle 112.

The magnetic disks 41 are spaced with a predetermined distance between each other and are rotated by the spindle 112 which is powered by a D.C. motor 114 attached to one end of the spindle 112. The magnetic head positioner 113 has a similar structure as that of the known magnetic disk pack. The positioner 113 has arms (not completely shown) fixed to a spindle 115 which is supported by ball bearings 119 and 120. The spindle 115 is driven by the voice coil motor 43 to rotate about its axis to the left and right by a desired angle. Hence, the servo head 42 supported by the arms is brought to a desired position over the magnetic disk 41.

The arrangement of the magnetic disks is further disclosed in a U.S. Pat. No. 4,899,237, the disclosure of which is hereby incorporated by reference.

The velocity detection circuit 45 detects an actual velocity Vr from the position signal Ps and a detection circuit Ic which will be described later, and supplies the actual velocity Vr to a velocity error detection circuit 48. The velocity error detection circuit 48 detects a velocity error signal $\Delta V$ from the actual velocity Vr and a target velocity Vc, and supplies the velocity error signal $\Delta V$ to a power amplifier and switching part 49. A control current Is which is output from the power amplifier and switching part 49 drives the voice coil motor 43 and is detected by a control current detection circuit 50 which generates the detection current Ic described above. This detection current Ic is supplied to the velocity detection circuit 45 as described above and is also supplied to the position error detection circuit 46. The position error detection circuit 46 detects a position error signal $\Delta P$ from the position signal Ps and the detection current Ic, and supplies the position error signal $\Delta P$ to the power amplifier and switching part 49.

The track crossing pulse generating circuit 47 generates a track crossing pulse from the position signal Ps, and supplies the track crossing pulse to a main control part 51 which is formed from a micro processor unit (MPU). The main control part 51 generates the target velocity Vc depending on a moving quantity of the servo head 42, monitors the position of the servo head 42 from the track crossing pulse, and supplies to the power amplifier and switching part 49 a coarse/fine switching signal which switches the control from a coarse velocity control to a fine position control in a vicinity of the target position. The switching part of the power amplifier and switching part 49 switches the velocity error signal $\Delta V$ from the velocity error detection circuit 48 or the position error signal $\Delta P$ from the position error detection circuit 46 in response to the coarse/fine switching signal, and outputs the control current Is.

The velocity detection circuit 45 and the velocity error detection circuit 48 form a velocity control part. On the other hand, the position error detection circuit 46, the track crossing pulse generating circuit 47, the power amplifier and switching part 49, the control current detection circuit 50 and the main control part 51 form a position control circuit.

When the main control part 51 receives the moving quantity (number of tracks) of the servo head 42, the main control part 51 generates the target velocity Vc which is dependent on the moving quantity and supplies the target velocity Vc to the velocity error detection circuit 48. As a result, the control current Is is supplied to the voice coil motor 43 via the velocity error detection circuit 48 and the power amplifier and switching part 49, so as to drive the servo head 42. When it is detected via the position signal generating circuit 44 and the track crossing pulse generating circuit 47 that the servo head 42 has reached a position in the vicinity of the target position, the power amplifier and switching part 49 is switched to the position control side. As a result, the position control of the servo head 42 is carried out depending on the position error signal $\Delta P$ which is output from the position error detection circuit 46, and the servo head 42 is positioned to the target track.

According to this embodiment, the main control part 51 starts an internal timer (not shown) when the seek operation is started. After the velocity control and the position control of the head are started, the main control part 51 constantly checks whether or not the time measured by the internal timer is has reached a predetermined access time Ta, and the seek operation is ended only after the predetermined access time Ta is reached.

Next, a description will be given of a first embodiment of a head positioning method according to the present invention, by referring to FIG. 6 which shows the operation of the main control part 51 shown in FIG. 1.

Figure 6:
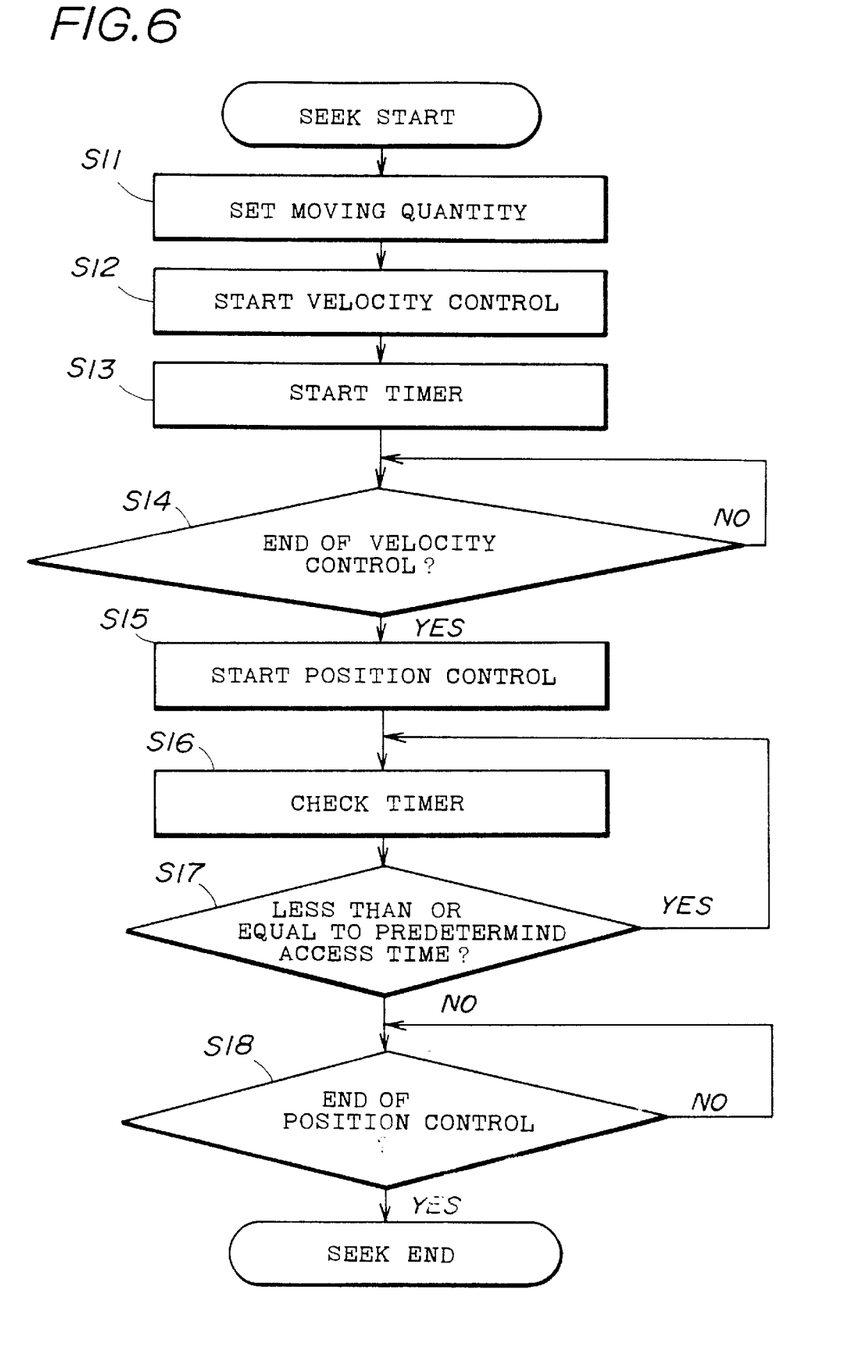
FIG. 6 is a flow chart for explaining a first embodiment of a head positioning method according to the present invention.

In FIG. 6, a step S11 sets the moving quantity of the servo head 42 when the seek operation is started. This moving quantity is received from a host (not shown), for example. A step S12 starts the velocity control of the servo head 42, using the velocity error signal $\Delta V$ shown in FIG. 1. Then, a step S13 starts the internal timer of the main control part 51, and a step S14 decides whether or not the velocity control is ended. A step S15 starts the position control of the servo head 42, using the position error signal $\Delta P$ shown in FIG. 1, when the decision result in the step S14 becomes YES.

A step S16 checks whether or not the time measured by the internal timer is less than the predetermined access time Ta. The process returns to the step S16 if the decision result in the step S16 is YES. On the other hand, when the decision result in the step S17 becomes NO, a step S18 decides whether or not the position control is ended. The process ends when the decision result in the step S18 becomes YES.

Figure 7:
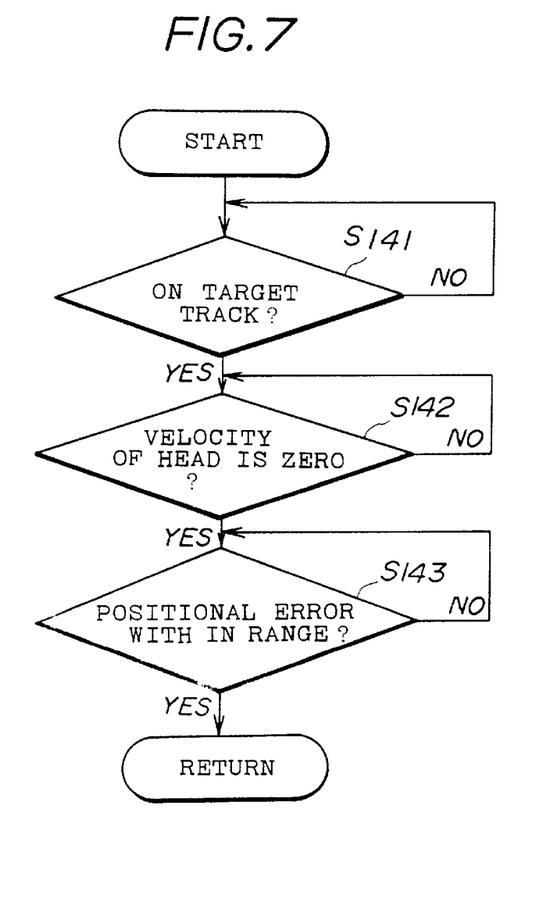
FIG. 7 is a flow chart for explaining a step shown in FIG. 6 in more detail.

FIG. 7 shows the step S14 shown in FIG. 6 in more detail. Based on the track crossing pulse from the track crossing pulse generating circuit 47, a step S141 shown in FIG. 7 decides whether or not the servo head 42 is positioned on the target track. For example, an internal counter (not shown) within the main control part 51 can count the track crossing pulse and detect that the servo head 42 is positioned on the target track when a predetermined number of track crossing pulses is counted. When the decision result in the step S141 becomes YES, a step S142 decides whether or not the velocity of the servo head 42 is zero, based on the actual velocity Vr which is detected by and received from the velocity detection circuit 45. In addition, when the decision result in the step S142 becomes YES, a step S143 decides whether or not the positional error of the servo head 42 is within a predetermined range, based on the position error signal ΔP from the position error detection circuit 46. The step 14 ends when the decision result in the step S143 becomes YES. For example, the predetermined range used in the step S143 is ±3 μm.

In this embodiment, the end of the velocity control is detected by sequentially checking whether or not the servo head 42 is positioned on the target track, whether or not the velocity of the servo head 42 is zero, and whether or not the positional error of the servo head 42 is within the predetermined range. However, it is of course possible to detect the end of the velocity control based on only one of the decisions of the steps S141 through S143, or based on an arbitrary combination of two decisions out of the steps S141 through S143.

In this embodiment, the predetermined access time Ta is set less than or equal to an predetermined value which is dependent on the moving quantity of the servo head 42. In this case, even if the actual access time falls short of the predetermined access time Ta and the end of the seek operation is advanced in the unstable state, it is possible to constantly maintain the seek operation until the predetermined access time Ta elapses, thereby eliminating the accumulation of the resonance component (unstable state) and prevent the resonance state.

Figure 8:
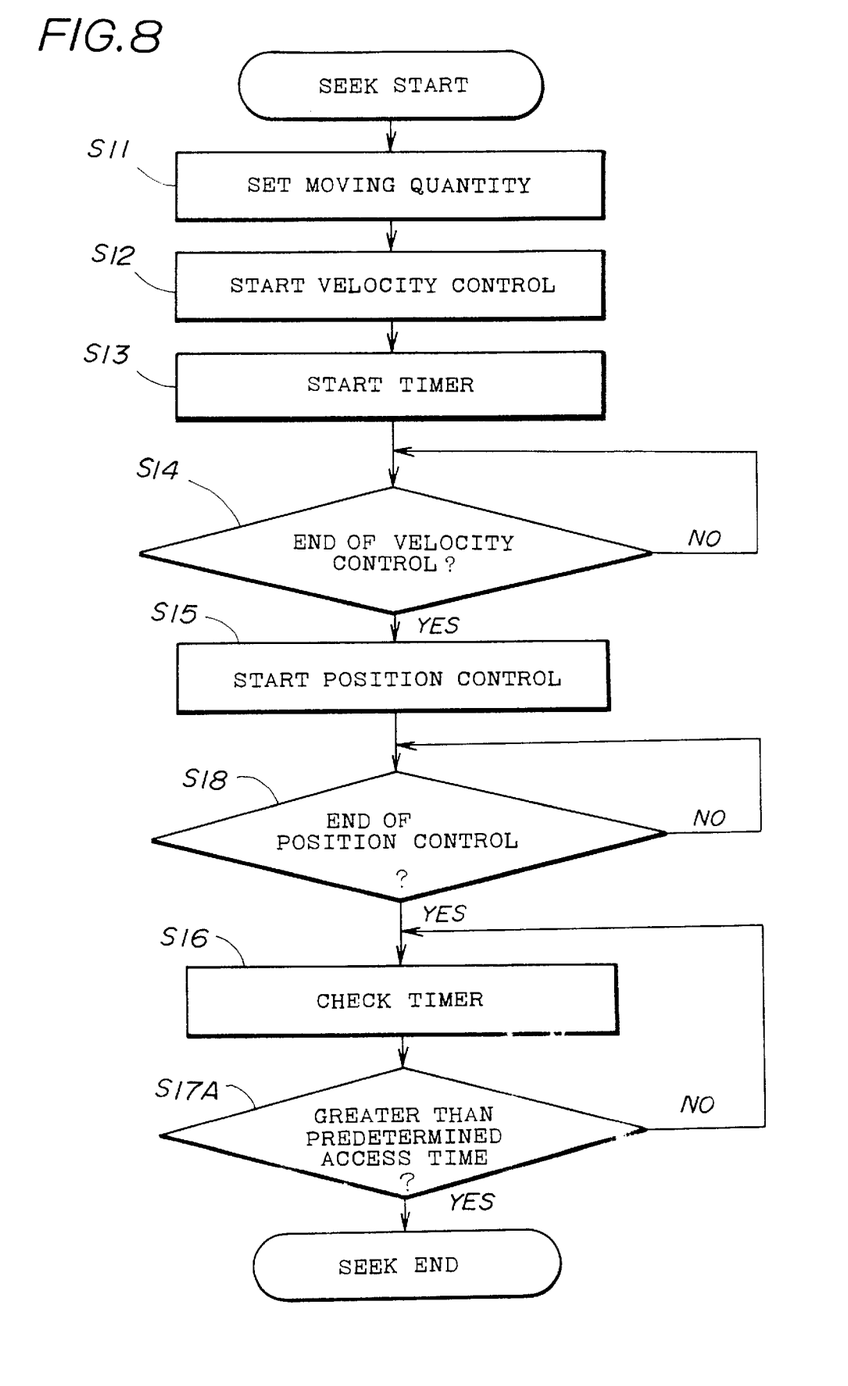
FIG. 8 is a flow chart for explaining a second embodiment of the head positioning method according to the present invention.

Next, a description will be given of a second embodiment of the head positioning method according to the present invention, by referring to FIG. 8 which shows the operation of the main control part 51 shown in FIG. 1. In FIG. 8, those steps which are basically the same as those corresponding steps in FIG. 6 are designated by the same reference numerals, and a description thereof will be omitted.

In this embodiment, the step S18 is carried out after the step S15. The steps S16 and S17A are successively carried out when the decision result in the step S18 becomes YES. The step S17A decides whether or not the time measured by the internal timer of the main control part 51 exceeds the predetermined access time Ta. The process returns to the step S16 when the decision result in the step S17A is NO. On the other hand, the process ends when the decision result in the step S17 becomes YES.

In this embodiment, the time measured in the internal timer is checked until the predetermined access time Ta is exceeded. In addition, the predetermined access time Ta is set greater than an predetermined value which is dependent on the moving quantity of the servo head 42. Hence, the generation of the unstable state which may cause the resonance state is prevented in advance by extending the end of the seek operation to a time which exceeds the predetermined value which is dependent on the moving quantity of the servo head 42.

Figure 9A:
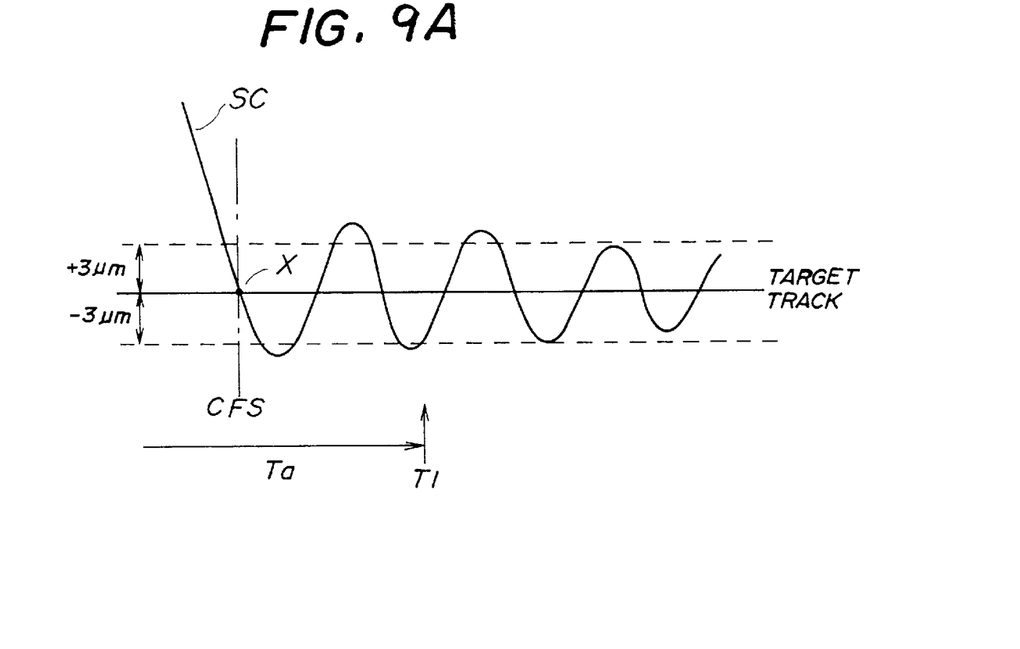
FIGS. 9A and 9B are diagrams for explaining the effects of the present invention.

Therefore, according to the present invention, even if the positional error of the servo head 42 temporarily becomes zero at a point X shown in FIG. 9A, the end of the seek operation is extended to a time T1 when the predetermined access time Ta ends. Hence, it is possible to prevent an extremely large resonance component of the servo head 42 from being accumulated with successive seek operations.

Figure 9B:
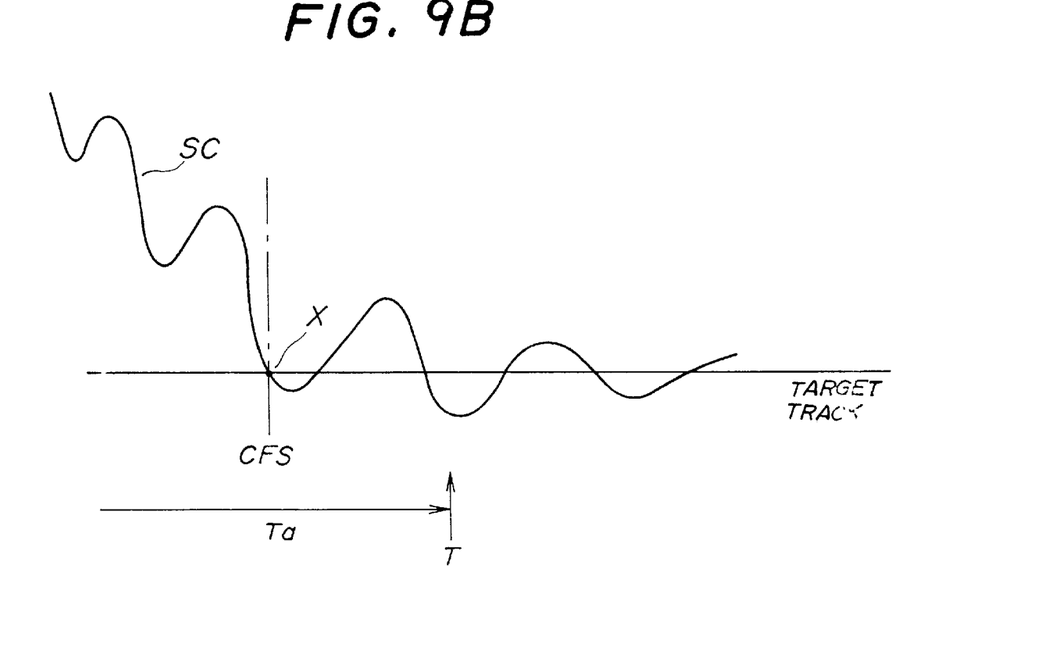

In actual practice, and particularly when the seek operations are carried out in succession, the resonance component is accumulated and the scanning locus of the servo head 42 becomes as shown in FIG. 9B. However, since the present invention does not immediately end the seek operation at the point X when the actual access time ends, it is possible to satisfactorily suppress the resonance by the time T1 when the predetermined access time ta ends. Accordingly, the present invention is particularly effective when the seek operation is carried out to seek an nth (target) track in a state where the servo head 42 is positioned on an (n−1)th track.

Further, the present invention is not limited to these embodiments, but various variations and modifications may be made without departing from the scope of the present invention.

What is claimed is:

1. A servo head positioning circuit for controlling a position of a servo head from a first track position on a disk to a second track position on the disk during a seek operation, said servo head reading a servo signal from tracks formed on the disk, said servo head positioning circuit comprising:

position control means, supplied with an initial movement quantity of the servo head, for controlling position of the servo head based on the initial movement quantity and a difference between a present track position of the servo head and the second track position; and velocity control means, coupled to said position control means, for controlling velocity of the servo head based on the initial movement quantity and the difference, said position control means including a control part for ending the seek operation after a predetermined access time elapses from a start of the seek operation when an actual access time is shorter than the predetermined access time, and ending the seek operation after the actual access time when the actual access time is greater than the predetermined access time, said predetermined access time being preset depending on the initial movement quantity, and said actual access time being a time actually required for the servo head to move from the first track position to the second track position.

2. The servo head positioning circuit as claimed in claim 1, wherein said position control means starts controlling the position of the servo head after said velocity control means controls the velocity of the servo head.

3. The servo head positioning circuit as claimed in claim 2, wherein said position control means includes means for detecting an end of controlling the velocity of the servo head by said velocity control means when at least one of three conditions is satisfied, said three conditions being that the servo head has reached the second track position, and the velocity of the servo head is zero and a positional error of the servo head from the second track position is within a certain range.

4. The servo head positioning circuit as claimed in claim 2, wherein said position control means includes means for detecting an end of controlling the velocity of the servo head when first, second and third conditions are sequentially satisfied, said first condition being that the servo head has reached the second track position, said second condition being that the velocity of the servo head is zero, and said third condition being that a positional error of the servo head from the second track position is within a certain range.

5. The servo head positioning circuit as claimed in claim 1, wherein the predetermined access time is less than or equal to a predetermined value which is dependent on the initial movement quantity.

6. The servo head positioning circuit as claimed in claim 1, wherein the predetermined access time is greater than a predetermined value which is dependent on the initial movement quantity.

7. The servo head positioning circuit as claimed in claim 1, wherein a scanning locus of the servo head includes a resonance component which is accumulated with successive seek operations.

8. The servo head positioning circuit as claimed in claim 1, wherein the first and second track positions are mutually adjacent tracks on the disk.

9. The servo head positioning circuit as claimed in claim 1, wherein said position control means further includes a position error detection circuit for detecting a positional error of the servo head and for outputting a position error signal based on a detection current and a position signal which is derived from a signal which is reproduced by the servo head;

a track crossing pulse generating circuit for detecting a crossing of the second track position by the servo head based on the position signal and for outputting a track crossing pulse;

a power amplifier and switching part, supplied with a velocity error signal and the position error signal, for outputting a control current in response to a switching signal; a control current detection circuit for outputting the detection current based on the control current, said control part receiving at least the track crossing pulse, and said velocity control means includes a velocity detection circuit for detecting an actual velocity of the servo head based on the position signal and the detection current; and a velocity detection circuit for detecting an actual velocity of the servo head based on the position signal and the detection current; and a velocity error detection circuit for detecting a velocity error of the servo head based on the actual velocity and a target velocity which is output from the control part based on the initial movement quantity and the difference, and for outputting the velocity error signal, the servo head being driven by a voice coil motor which is controlled by the control current.

10. The servo head positioning circuit as claimed in claim 9, wherein the control part of said position control means detects an end of controlling the velocity of the servo head by said velocity control means based on the actual velocity, the position error signal and the track crossing pulse when at least one of three conditions is satisfied, said three conditions being that the servo head is positioned on the second track position, the velocity of the servo head is zero and a positional error of the servo head from the second track position is within a certain range.

11. A method for positioning a servo head at a track, comprising the steps of:

a) presetting a predetermined access time for moving the servo head to the track, based on a distance from the position of the servo head before a seek operation and the position of the track;

b) performing the seek operation requiring an actual access time to position the servo head over the track;

c) terminating the seek operation after the predetermined access time if the predetermined access time is greater than the actual access time; and d) terminating the seek operation after the actual access time if the actual access time is greater than the predetermined access time.

12. A servo head positioning method for controlling a position of a servo head from a first track position on a disk to a second track position on the disk during a seek operation, said servo head reading a servo signal from tracks formed on the disk, said servo head positioning method comprising the steps of:

(a) setting an initial movement quantity of the servo head and a predetermined access time in dependence upon the initial movement quantity;

(b) controlling velocity and position of the servo head depending on the initial movement quantity and a difference between a present track position of the servo head and the second track position;

(c) detecting when the servo head reaches the second track position;

(d) detecting passage of the predetermined access time from a start of the seek operation;

(e) ending the seek operation after said detecting in step (d) if said detecting in step (c) occurs earlier than said detecting in step (d); and (f) ending the seek operation after said detecting in step (c) if said detecting in step (c) occurs later than said detecting in step (d).

13. The servo head positioning method as claimed in claim 12, wherein said step (b) starts controlling the position of the servo head after controlling the velocity of the servo head.

14. The servo head positioning method as claimed in claim 13, wherein said step (b) detects an end of controlling the velocity of the servo head when at least one of three conditions is satisfied, said three conditions being that the servo head has reached the second track position, the velocity of the servo head is zero and a positional error of the servo head from the second track position is within a certain range.

15. The servo head positioning method as claimed in claim 13, wherein said step (b) detects an end of controlling the velocity of the servo head when first, second and third conditions are sequentially satisfied, said first condition being that the servo head has reached the second track position, said second condition being that the velocity of the servo head is zero, and said third condition being that a positional error of the servo head from the second track position is within a certain range.

16. The servo head positioning method as claimed in claim 12, wherein the predetermined access time is less than or equal to a predetermined value which is dependent on the initial movement quantity.

17. The servo head positioning method as claimed in claim 12, wherein the predetermined access time is greater than a predetermined value which is dependent on the initial movement quantity.

18. The servo head positioning method as claimed in claim 12, wherein a scanning locus of the servo head includes a resonance component which is accumulated with successive seek operations.

19. The servo head positioning method as claimed in claim 12, wherein the first and second track positions are mutually adjacent tracks on the disk.

* * * * *